(12) United States Patent
Korhonen

(10) Patent No.: US 8,355,695 B2
(45) Date of Patent: Jan. 15, 2013

(54) SECURED DATA TRANSMISSION IN COMMUNICATIONS SYSTEM

(75) Inventor: Jouni Korhonen, Riihimäki (FI)

(73) Assignee: Teliasonera AB, Stockholm (SE)

( * ) Notice: Subject to any disclaimer, the term of this patent is extended or adjusted under 35 U.S.C. 154(b) by 139 days.

(21) Appl. No.: 12/734,432

(22) PCT Filed: Oct. 29, 2008

(86) PCT No.: PCT/FI2008/050611
§ 371 (c)(1),
(2), (4) Date: Apr. 30, 2010

(87) PCT Pub. No.: WO2009/056681
PCT Pub. Date: May 7, 2009

(65) Prior Publication Data
US 2010/0261451 A1    Oct. 14, 2010

(30) Foreign Application Priority Data
Nov. 1, 2007    (FI) ..................................... 20075780

(51) Int. Cl.
*H04W 12/00* (2009.01)
*H04W 36/00* (2009.01)

(52) U.S. Cl. ......... 455/410; 370/310; 370/338; 709/203

(58) Field of Classification Search .................. 455/410; 370/310, 338; 707/103 R; 709/203
See application file for complete search history.

(56) References Cited

U.S. PATENT DOCUMENTS

| | | | | |
|---|---|---|---|---|
| 6,769,000 B1 * | 7/2004 | Akhtar et al. | ......................... | 1/1 |
| 7,079,499 B1 * | 7/2006 | Akhtar et al. | ................. | 370/310 |
| 2004/0025051 A1 | 2/2004 | Adrangi et al. | | |
| 2004/0158706 A1 | 8/2004 | Moritomo et al. | | |
| 2004/0221154 A1 | 11/2004 | Aggarwal | | |
| 2006/0136557 A1 * | 6/2006 | Schaedler et al. | ............ | 709/203 |
| 2006/0224742 A1 | 10/2006 | Shahbazi | | |

(Continued)

FOREIGN PATENT DOCUMENTS
WO    WO 2006/087429 A1    8/2006

OTHER PUBLICATIONS

GSM Association: "GSM Association Official Document IR.34, Inter-Service Provider IP Backbone Guidelines". 20070131, No. Official Document: IR. 34, Version 4.1, Jan. 31, 2007.

(Continued)

*Primary Examiner* — William D Cumming
(74) *Attorney, Agent, or Firm* — Cozen O'Connor

(57) ABSTRACT

A solution for providing a data security service in a wireless communications system (S) is disclosed. In the solution, a first security association (SA1) is established between an anchor node (LMA1) located in a home operator network (N1) and a concentrator node (Ha) located in an interconnecting operator network (GRXa). In addition, a second security association (SA2, SA3, SA4, SA5) is established between an access node (MAG1, MAG2, MAG3, MAG4, MAG5) located in a roaming operator network (N2, N3, N4, N5) and the concentrator node (Ha, Hb) located in the interconnecting operator network (GRXa, GRXb). A user terminal (UE1-2, UE1-3, UE1-4, UE1-5) roaming in the roaming operator network (N2, N3, N4, N5) can then access external network services (E) by utilizing the first security association (SA1) and the second security association (SA2, SA3, SA4, SA5), respectively.

13 Claims, 7 Drawing Sheets

U.S. PATENT DOCUMENTS

| | | | |
|---|---|---|---|
| 2007/0160017 A1* | 7/2007 | Meier et al. | 370/338 |
| 2007/0199060 A1 | 8/2007 | Touboul | |
| 2010/0261451 A1* | 10/2010 | Korhonen | 455/410 |

OTHER PUBLICATIONS

"3<sup>rd</sup> Generation Partnership Project, Technical Specification Group Services and System Aspects; 3G Security; Network Domain Security/Authentication Framework (NDS/AF) Feasibility study to support NDS/IP evolution (Release 6)" 3GPP Standard; 3GPP TR 33.810, 3<sup>rd</sup> Generation Partnership Project (3GPP), Mobile Competence Center; 650 Route DES Lucioles; F-06921 Sophia-Antipolis CEDEX, France No. V6.0.0, Dec. 1, 2002 XP050376871.

GSM Association: GSM Association Official Document IR.61 WLAN Roaming Guidelines:, GSM Association Official Document (Online) Aug. 31, 2004 XP002617857, Retrieved from Internet URL:http://www.gsmworld.com/newsroom/document-library/technical_documents.htm> retrieved Jan. 21, 2011.

3GPP: 3<sup>rd</sup> Generation Partnership Project; Technical Specification Group Services and System Aspects; Security aspects for inter-access mobility between non 3GPP and 3GPP access network (Release 7), 3GPP Draft; TR33922V010_TR, 3<sup>rd</sup> Generation Partnership Project (3GPP), Mobile Competence Centre; 650 Route DES Lucioles; F-06921 Sophia-Antipolis CEDEX, France vol. SA WG2 No. Ljubljana, 20071025, Oct. 25, 2007, XP050262449.

Ericcson: "Handling of expiry time and the lifetime of an SDA", 3GGP Draft; S3-020225_CR_Expiry Time, 3<sup>rd</sup> Generation Partnership Project (3GPP). Mobile Competence Centre; 650 Route DES Lucioles; F-06921 Sophia-Antipolis CEDEX, France, vol. SA WG3, No. Victoria, 20020511, May 11, 2002 XP050272480, retrieved May 11, 2002.

"3<sup>rd</sup> Generation Partnership Project; Technical Specification Group Services and System Aspects; 3G Security, Network Domain Security; IP network layer security (Release 7)", 3GPP Standard; 3GPP TS 33.210, 3<sup>rd</sup> Generation Partnership Project (3GPP), Mobile Competence Centre; 650 Route DES Lucioles; F-06921 Sophia-Antipolis CEDEX, France, No. V7.3.0, Sep. 1, 2007, XP050376670.

Mohanty, S. Performance analysis of a novel architecture to integrate heterogenous wireless systems. Computer Networks Dec. 28, 2006 vol. 51, No. 4, pp. 1095-1105, XP5817614, ISSN 1389-1286, Figures 1 and 3; p. 1097, col. 2, lines 26-40; p. 1097, col. 2, line 44—p. 1098, col. 1, line 3; p. 1098, col. 2, line 25—p. 1099, col. 1, line 10, p. 1099, col. 1, lines 17-27; p. 1099, col. 2, lines 4 and 7-17.

Wan, C. et al. The bootstrapping for Proxy mobile (Pv6', IETF Standard Internet Engineering Task Force, IETF CH, Jul. 20, 2007, XP015052303, ISSN: 0000-0004, Abstract; sections 1 and 4.3.

* cited by examiner

SECURED DATA TRANSMISSION IN COMMUNICATIONS SYSTEM

PRIORITY CLAIM

This is the U.S. national stage of application No. PCT/FI2008/050611, filed on 29 Oct. 2008. Priority is claimed from Finland Patent Application No. 20075780, filed 1 Nov. 2007, the entire content of which is expressly incorporated herein by reference.

FIELD OF THE INVENTION

The present invention relates to providing a secured data transmission service to a roaming user terminal in a wireless communications system.

BACKGROUND OF THE INVENTION

Enhanced mobile communications networks, such as 3GPP Rel-8, Mobile WiMAX and 3GPP2, will support proxy mobile IPv6 protocol as one of the mobility solutions for packet-based data traffic. The proxy mobile IPv6 protocol involves a mobility access gateway (MAG) located in the access network, for providing access to user terminals, and a local mobility anchor (LMA) located in the home network acting as the first hop router and providing access to external networks such as the Internet. According to the proxy mobile IPv6 protocol, the mobility access gateway (MAG), and the local mobility anchor (LMA) share a security association (SA). This could, for example, be an IPSec SA. In each access network, there are usually several mobility access gateways (MAG). In conventional mobile IPv6, the security associations exist between a home agent and a user terminal. A difference between the proxy mobile IPv6 and the conventional mobile IPv6 is that in the conventional mobile IPv6, the user terminal belongs to a subscriber of the home operator, and the security association is checked, even in the roaming cases, during a normal checking of the customership. So the security association (SA) has to exist anyway. In the proxy mobile IPv6, the mobility access gateway does not belong to the home network operator, but to a roaming partner. SA is between MAG and LMA, not between the user terminal and LMA. A roaming terminal is authenticated and authorized towards the home operator prior to allowing it to attach to MAG, since LMA trusts every terminal accessing external networks from a MAG with which it has an SA.

One of the problems associated with the above arrangement is that, especially in roaming cases, management of the security associations is problematic. For example, if an operator has 100 MAG components and the home operator has 250 roaming partners, there have to be 25 000 security associations simply for roaming—in the worst case for every local mobility anchor (LMA). These SAs are in addition to normal subscription SAs that the home operator has with each of its subscribers. Technically, this is an administrative problem as well as a scalability problem, especially in the roaming cases. Each mobility access gateway (MAG) brought into the access network requires a new security association and verification over the roaming connection. In addition, if the operator adds, removes and/or changes MAG, the roaming partners have to agree on a new security association (SA) with the added, removed and/or changed MAG. Another disadvantage associated with the current solutions is that they require a number of static configurations. As each LMA-MAG connection involves a security association of its own, changes in the home network are soon reflected in the interconnecting and roaming partners. If something is changed, the security association has to be updated. Even if the creation of SA between MAG and LMA may be dynamic, in a roaming environment these kind of arrangements tend to be statically configured. In the case of a dynamically created SA (e.g. by using IKEv2 negotiation) the complexity of distribution of credentials still remains.

BRIEF DESCRIPTION OF THE INVENTION

It is thus an object of the present invention to provide a method, system, and a network node for implementing the method so as to so as to alleviate above disadvantages. The objects of the invention are achieved by a method and an arrangement which are characterized by what is stated in the independent claims. Preferred embodiments of the invention are disclosed in the dependent claims.

The present invention involves introducing a concentrator node into an interconnecting operator network. The present invention further involves establishing a first security association between the concentrator node and an anchor node located in a home operator network of a user terminal, as well as establishing a second security association between the concentrator node and an access node located in a roaming operator network. Data traffic between the user terminal roaming in the roaming operator network, and an external network such as the Internet, is then carried out by utilizing said security associations.

An advantage of the method and arrangement of the invention is that the number of security associations needed in the system can be significantly reduced. Instead of a huge number of security associations, the home network operator only needs to agree on a single SA between the anchor node and the concentrator node in order to manage the roaming cases.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
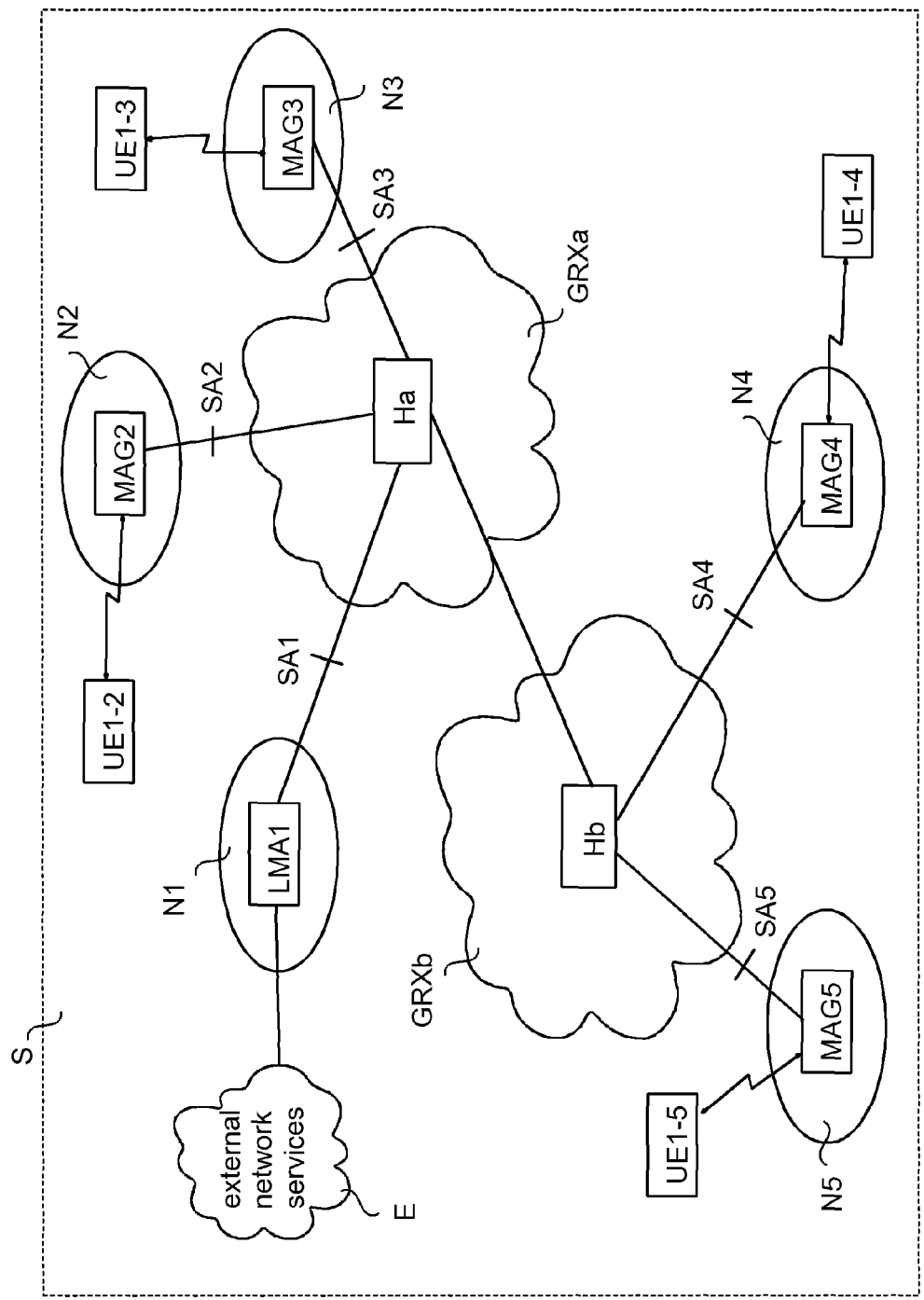
FIG. 1 illustrates the general architecture of a communication system according to an embodiment of the present solution.

In the following, embodiments of the invention will be described with reference to an advanced cellular mobile communications system, such as 3GPP Rel-8, 3GPP2, or Mobile WiMAX. However, the invention is not meant to be restricted to these embodiments. The present invention is applicable to any network node, corresponding component(s), and/or to any communication system or any combination of different communication systems capable of providing packet-switched data transmission, such as 4G, Beyond-3G, or WLAN. The communication system may be a fixed communication system, a wireless communication system or a communication system utilizing both fixed networks and wireless networks. The protocols used and the specifications of communication systems and network nodes, especially in mobile and wireless communication, develop rapidly. Such development may require extra changes in an embodiment. Therefore, all words and expressions should be interpreted broadly and they are intended to illustrate, not to restrict, the embodiment. The relevant inventive aspect is the functionality concerned, not the network element or equipment where it is executed.

A security association (SA) refers to a connection between two or more communications network entities, describing how the entities will utilise security services in order to communicate securely. The security association defines which transformations and algorithms are used in an authentication header or encapsulating security payload to provide security services for the data traffic it carries.

A GPRS roaming exchange (GRX) network refers to a centralised IP routing network that interconnects general packet radio service (GPRS) networks, and enables a global roaming coverage for wireless networks, directly or via other GRX networks. GRX is defined in the GSMA PRD IR.34 document.

Worldwide interoperability for microwave access (WiMAX) refers to a technology for wireless networks that operates according to an IEEE 802.16 standard. WiMAX is a wireless metropolitan area network technology providing a last mile broadband access connection from wireless local area network (WLAN) access points to the Internet. WiMAX is complementary to WLAN and wireless fidelity (Wi-Fi), providing an increased bandwidth and a wider wireless coverage.

The present solution is based on the idea of introducing a concentrator node, such as a proxy mobile IPv6 hub, into a network implementing the proxy mobile IPv6 protocol. The present solution enables a hub/proxy solution using the proxy mobile IPv6 protocol for interconnecting networks where roaming data traffic is transferred on top of the proxy mobile IPv6 protocol. The present solution introduces a proxy mobile IPv6 hub into the interconnecting network, being managed by the preferred interconnecting network operator. Here, the interconnecting network refers, for example, to a GPRS roaming exchange (GRX) network or its evolutions such as IPX (Internet packet exchange as defined in GSMA PRD IR.34). The present solution is based on the idea that a home network operator has a single connection to the hub, and the hub is connected to the mobility access gateway (MAG) of the roaming partner. Thus the roaming connections are behind a single hub hosted, for example, by the GRX network provider when using the proxy mobile IPv6 protocol. The location of the hub is not tied to GRX, although it is a feasible place for deploying such a hub node. The proxy mobile IPv6 hub according to the present solution appears logically as a mobility access gateway (MAG) to a local mobility anchor (LMA) located in the home network, and between LMA and the hub, only a single security association (SA) is needed. The rest of the traffic is arranged such that a further security association is agreed between the hub and the mobility access gateway (MAG). Similarly the proxy mobile IPv6 hub appears as LMA to MAG. A single SA is needed also in this case between the hub and MAG. Multiple proxy mobile IPv6 hubs may be inter-connected (chained) with each other, thus creating a hub (mesh) network.

In the following, embodiments of the present solution will be described with reference to the attached drawings.

FIG. 1 illustrates a communications system S according to an embodiment. Referring to FIG. 1, the system S comprises at least one user terminal UE1-2, UE1-3, UE1-4, UE1-5 that may be e.g. a mobile terminal or wireless terminal, such as a mobile phone (mobile station), a personal digital assistant (PDA), a game console, a laptop or the like, capable of operating in a packet-switched communications network. The system S further comprises at least one access network N1, N2, N3, N4, N5, such as a wireless local area network (WLAN), or a radio access network (RAN) of a cellular network. Here it is assumed that the access networks N1, N2, N3, N4, N5 are operated by different network operators, the access network N1 being the home operator network of the user terminal UE1-2, UE1-3, UE1-4, UE1-5 and including a local mobility anchor LMA1 (also referred to as an anchor node). In the situation shown in FIG. 1, the user terminal UE1-2 is roaming in the access network N2, the user terminal UE1-3 is roaming in the access network N3, the user terminal UE1-4 is roaming in the access network N4, and the user terminal UE1-5 is roaming in the access network N5. The access network N2, N3, N4, N5 (also referred to as a roaming operator network) includes at least one corresponding mobility access gateway (also referred to as an access node) MAG2, MAG3, MAG4, MAG5 for providing access to the user terminal UE1-2, UE1-3, UE1-4, UE1-5 via the corresponding access network N2, N3, N4, N5. Here it is assumed that the access nodes MAG2, MAG3, MAG5 are capable of connecting to LMA1 via a first GPRS roaming exchange network GRXa. It is further assumed that the access nodes MAG4, MAG5 are capable of connecting to LMA1 via the first GPRS roaming exchange network GRXa and a second GPRS roaming exchange network GRXb, combined. The first GPRS roaming exchange network GRXa includes a first concentrator node Ha (such as a proxy mobile IPv6 hub) according to the present solution, and the second GPRS roaming exchange network GRXb includes a second concentrator node Hb (such as a proxy mobile IPv6 hub) according to the present solution. In FIG. 1, a first security association SA1 according to the present solution has been established between LMA1 and Ha, and a second security association SA2, SA3, SA4, SA5 according to the present solution has been established between 1) Ha and MAG2, 2) Ha and MAG3, 3) Hb and MAG4, 4) Hb and MAG5, respectively. The roaming user terminal UE1-2, UE1-3, UE1-4, UE1-5 may get access to external network services E, via its home network N1, by using the first security association SA1 and the appropriate second security association SA2, SA3, SA4, SA5. FIG. 1 shows a simplified version of the network structure, which illustrates only the components that are essential to illustrate the present solution, even though those skilled in the art naturally know that a general communications system also comprises other functions and structures, which do not have to be described in more detail herein. The network node LMA1 may include any network element operated by a home network operator, for providing mobility for the user terminal, such as a gateway GPRS support node (GGSN), packet data network gateway (PDN-GW) or any proxy mobile IPv6-capable home agent. The network nodes MAG2, MAG3, MAG4, MAG5 may include any network element operated by a roaming network operator, for tracking the user terminal in the roaming network. MAG also functions as a network access server to the terminal, and the terminal has to be authenticated/authorised via MAG to the home operator network. There may be several alternatives to carry out the authentication and/or authorisation, depending on the access technology. For example, in connection with WiMAX an EAP-based authentication may be carried out, wherein MAG (i.e. ASN-GW in WiMAX) functions as the authenticator, forwarding the authentication to an AAA (authentication, authorisation, and accounting) server of the home operator, by using a selected AAA protocol. The network nodes Ha, Hb may include any network element operated by an interconnecting network operator, for providing a connection between access networks and interconnecting networks, such as a hub. The hub may thus include a router functionality, an IPSec GW functionality, and probably also an AAA client functionality. Although each network node LMA1, MAG2, MAG3, MAG4, MAG5, Ha, Hb has been depicted as one entity, different modules and memory may be implemented in one or more physical or logical entities.

Figure 2:
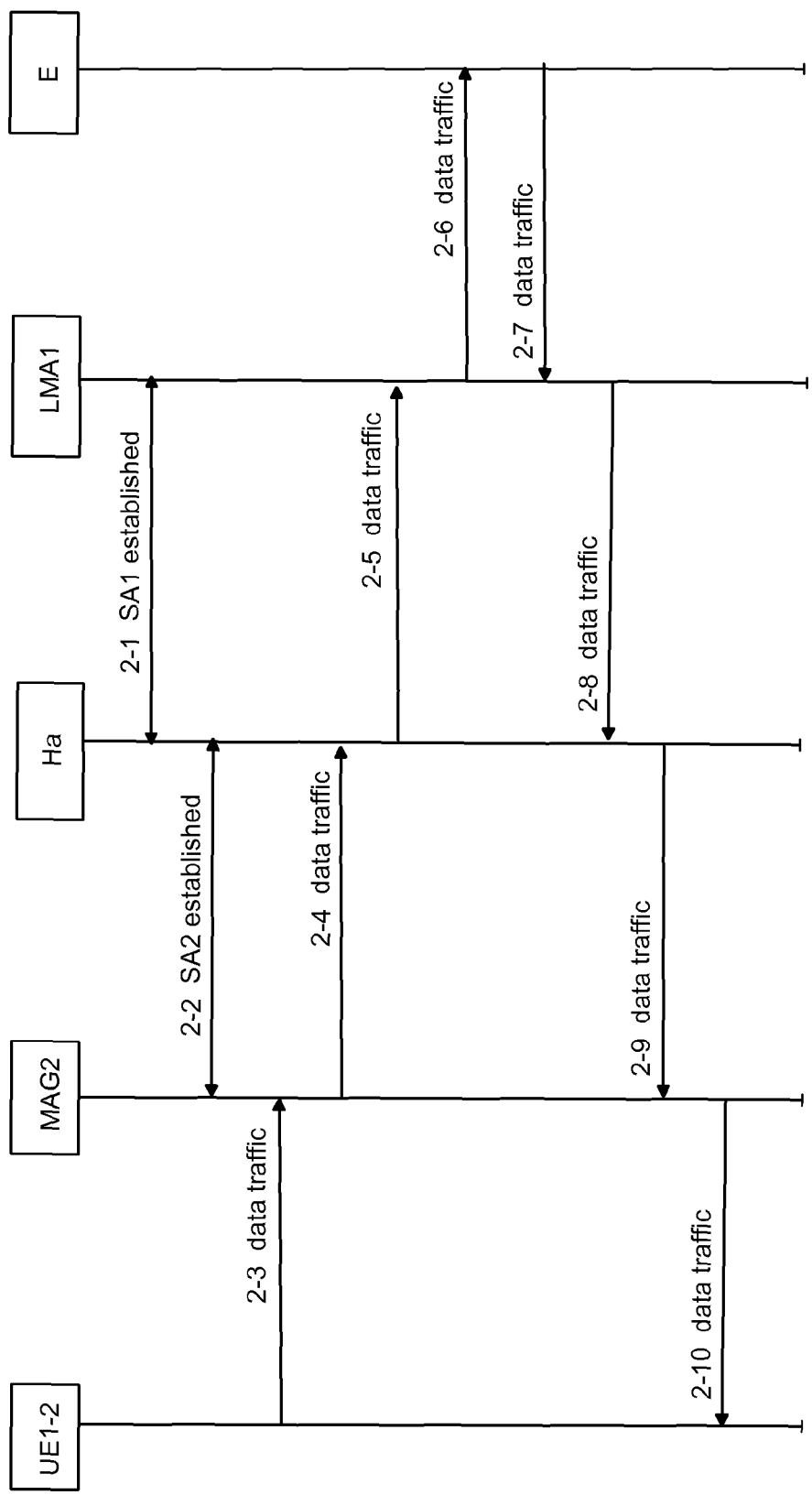
FIG. 2 illustrates signalling according to a first embodiment of the present solution.
Figure 3:
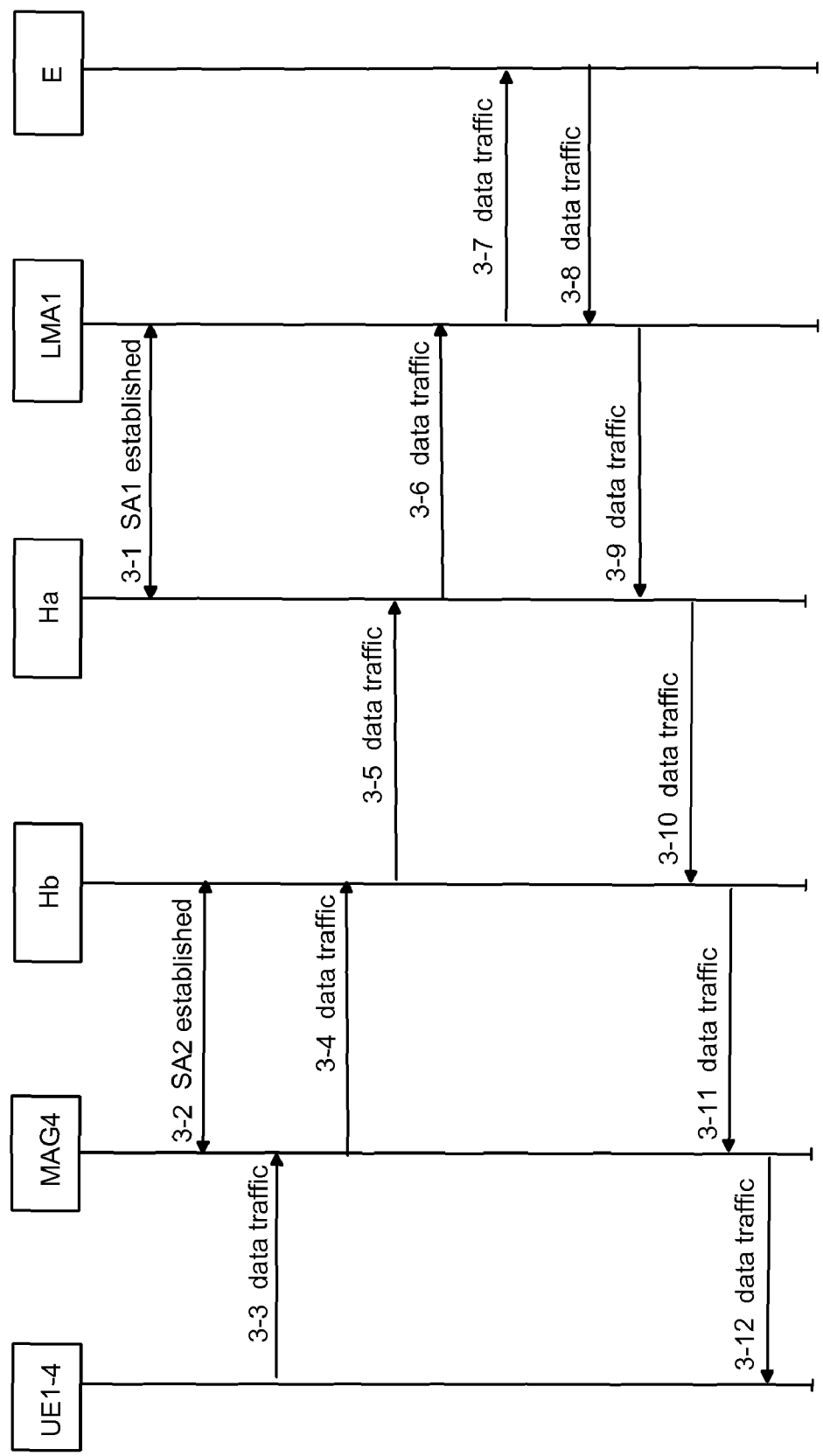
FIG. 3 illustrates signalling according to a second embodiment of the present solution.

FIGS. 2 and 3 illustrate signalling according to embodiments of the present solution.

According to a first embodiment of the present solution, with reference to FIG. 2, a first security association SA1 is established 2-1 between the local mobility anchor LMA1 (anchor node) located in the home operator network N1 of the user terminal UE1-2, and the concentrator node Ha (proxy mobile IPv6 hub) located in the interconnecting operator network GRXa. A second security association SA2 is established 2-2 between the concentrator node Ha located in the interconnecting operator network GRXa, and the mobility access gateway MAG2 (access node) located in the roaming operator network N2. During the establishing, the network nodes LMA1 and Ha, and Ha and MAG2 may exchange information on which kind of security protocol is to be used for the home network and the roaming network in question. Any existing signalling procedure may be utilized when the security association SA1, SA2 is established. The user terminal UE1-2 (located in N2) transmits 2-3 data traffic addressed to the external network E. The data is received in the access node MAG2 which forwards 2-4 the data to the concentrator node Ha by utilizing the second security association SA2 according to the first embodiment of the present solution. The data is received in the concentrator node Ha, which forwards 2-5 the data to the anchor node LMA1 by utilizing the first security association SA1 according to an embodiment of the present solution. As the data traffic is received in the anchor node LMA1, the anchor node LMA1 forwards 2-6 the data to the external network E (e.g. the Internet). In the message 2-7, data traffic addressed to the roaming user terminal UE1-2 is transmitted from the external network E to the anchor node LMA1. The data is received in LMA1, which forwards 2-8 it to the concentrator node Ha by utilizing the first security association SA1 according to the first embodiment of the present solution. The data is received in the concentrator node Ha, which forwards 2-9 it to the access node MAG2 by utilizing the second security association SA2 according to the first embodiment of the present solution. As the data traffic is received in the access node MAG2, the access node MAG2 forwards 2-10 the data to the user terminal UE1-2. It should be noted that the data transmission between the external network E and the user terminal UE1-3 is carried out in the same way, but in this case the access node to be used is MAG3, and the second security association to be used is SA3 (established between Ha and MAG3).

According to a second embodiment of the present solution, with reference to FIG. 3, a first security association SA1 is established 3-1 between the local mobility anchor LMA1 (anchor node) located in the home operator network N1 of the user terminal UE1-4 and the first concentrator node Ha (proxy mobile IPv6 hub) located in the first interconnecting operator network GRXa. A second security association SA4 is established 3-2 between the second concentrator node Hb (proxy mobile IPv6 hub) located in the second interconnecting operator network GRXb and the mobility access gateway MAG4 (access node) located in the roaming operator network N4. During the establishing, the network nodes LMA1 and Ha, and Ha and MAG2 may exchange information on which kind of security protocol is to be used for the home network and the roaming network in question. Any existing signalling procedure may be utilized when the security association SA1, SA2 is established. The user terminal UE1-4 (located in N4) transmits 3-3 data traffic addressed to the external network (E). The data is received in the access node MAG4, which forwards 3-4 the data to the second concentrator node Hb by utilizing the second security association SA4 according to the second embodiment of the present solution. The data is received in the second concentrator node Hb, which forwards 3-5 the data to the first concentrator node Ha. As the data is received in the first concentrator node Ha, the first concentrator node Ha forwards 3-6 the data to the anchor node LMA1 by utilizing the first security association SA1 according to an embodiment of the present solution. As the data traffic is received in the anchor node LMA1, the anchor node LMA1 forwards 3-7 the data to the external network E (e.g. the Internet). In the message 3-8, data traffic addressed to the roaming user terminal UE1-4 is transmitted from the external network E to the anchor node LMA1. The data is received in LMA1 which forwards 3-9 it to the first concentrator node Ha, by utilizing the first security association SA1 according to the second embodiment of the present solution. The data is received in the first concentrator node Ha, which forwards 3-10 it to the second concentrator node Hb. As the data is received in the second concentrator node Hb, the second concentrator node Hb forwards 3-11 the data to the access node MAG4 by utilizing the second security association SA4 according to the second embodiment of the present solution. As the data traffic is received in the access node MAG4, the access node MAG4 forwards 3-12 the data to the user terminal UE1-2. It should be noted that the data transmission between the external network E and the user terminal UE1-5 is carried out in the same way, but in this case the access node to be used is MAG5, and the second security association to be used is SA5 (established between Hb and MAG5).

FIGS. 4, 5, 6 and 7 illustrate the functionality of network nodes according to embodiments of the present solution.

Figure 4:
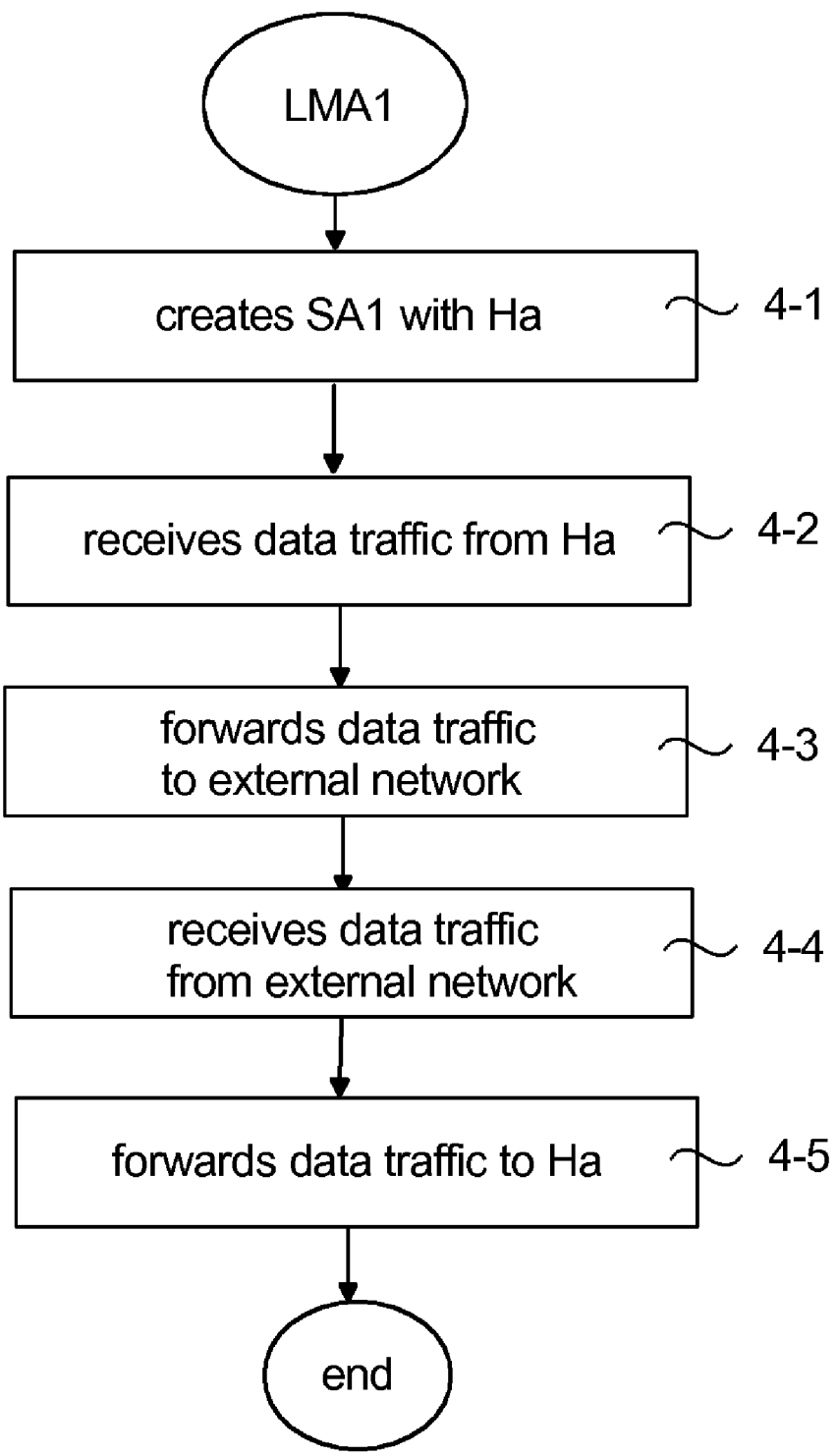
FIG. 4 is a flow chart illustrating the functionality of an anchor node according to an embodiment of the present solution.

FIG. 4 illustrates the functionality of the anchor node LMA1 (such as a local mobility anchor) according to an embodiment of the present solution. With reference to FIG. 4, the first security association SA1 is established, in step 4-1, with the first concentrator node Ha (such as proxy mobile IPv6 hub) located in the interconnecting operator network GRXa. In step 4-2, data traffic addressed to the external network E is received from the first concentrator node Ha by utilizing the first security association SA1. In step 4-3, the received data traffic is forwarded to the external network E. In step 4-4, data traffic addressed to the roaming user terminal UE1-2, UE1-3, UE1-4, UE1-5 is received from the external network E. In step 4-5, the received data traffic is forwarded to the first concentrator node Ha, by utilizing the first security association SA1.

Figure 5:
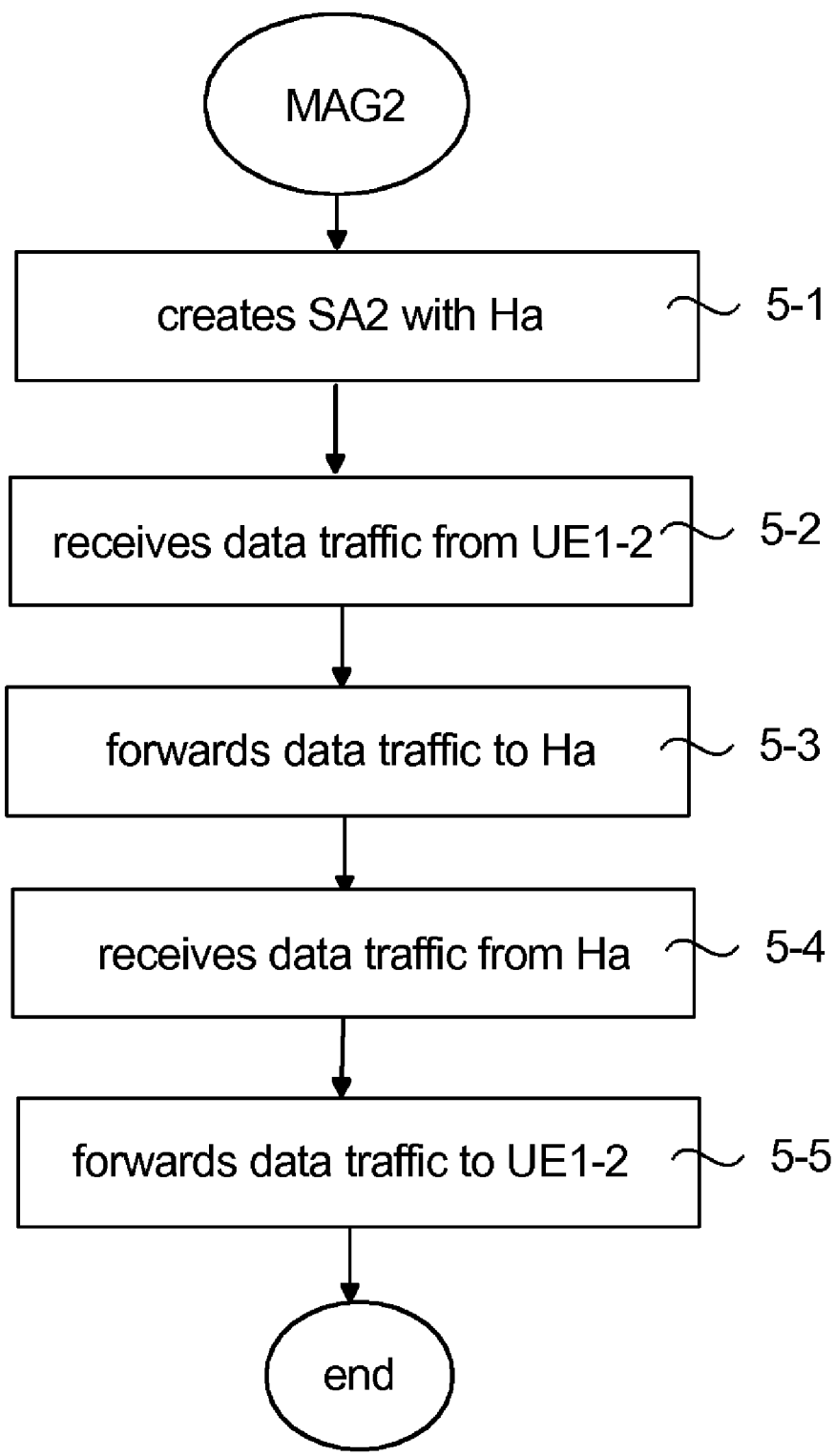
FIG. 5 is a flow chart illustrating the functionality of an access node according to an embodiment of the present solution.

FIG. 5 illustrates the functionality of the access node MAG2 (such as a mobility access gateway) according to an embodiment of the present solution. With reference to FIG. 5, the second security association SA2 is established, in step 5-1, with the concentrator node Ha (such as proxy mobile IPv6 hub) located in the interconnecting operator network GRXa. In step 5-2, data traffic addressed to the external network E is received from the roaming user terminal UE1-2 by utilizing the second security association SA2. In step 5-3, the received data traffic is forwarded to the concentrator node Ha. In step 5-4, data traffic addressed to the roaming user terminal UE1-2 is received from the concentrator node Ha. In step 5-5, the received data traffic is forwarded to the user terminal UE1-2 by utilizing the first security association SA1. It should be noted that the functionality of MAG3 is implemented accordingly, but in that case the user terminal is UE1-3, and the second security association is SA3 (established between Ha and MAG3). It should also be noted that the functionality of MAG4, MAG5 is implemented accordingly, but in that case the user terminal is UE1-4, UE1-5, and the second security association is SA4, SA5 (established between Hb and MAG4, MAG5), respectively.

Figure 6:
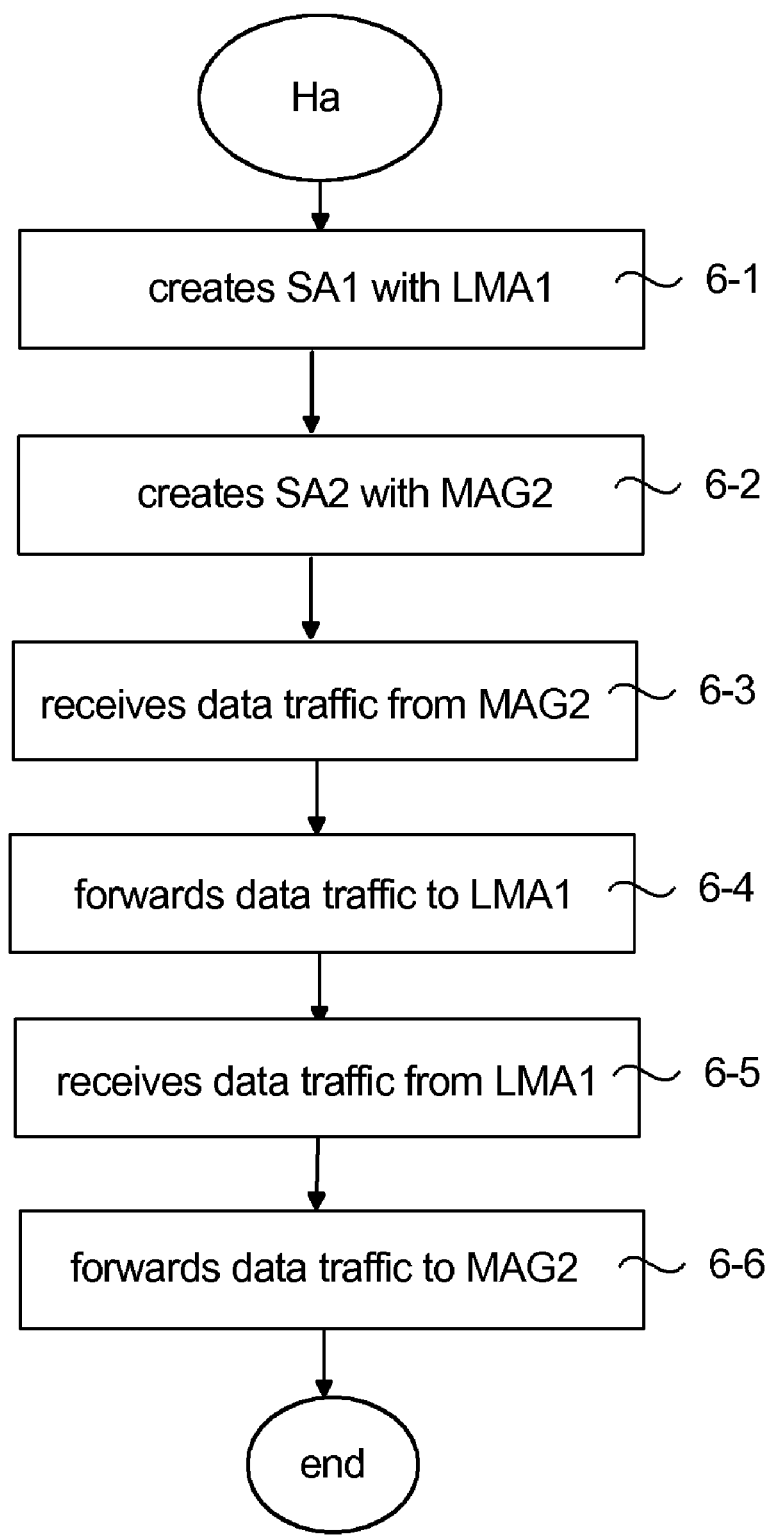
FIG. 6 is a flow chart illustrating the functionality of a concentrator node according to an embodiment of the present solution.

FIG. 6 illustrates the functionality of the concentrator node Ha (such as a proxy mobile IPv6 hub) according to a first embodiment of the present solution. With reference to FIG. 6, the first security association SA1 is established, in step 6-1, with the anchor node LMA1 (such as a local mobility anchor) located in the home operator network N1 of the user terminal UE1-2. In step 6-2, the second security association SA2 is established with the access node MAG2 (such as a mobility access gateway) located in the roaming operator network N2. In step 6-3, data traffic addressed to the external network E is received from the access node MAG2, by utilizing the second security association SA2. In step 6-4, the received data traffic is forwarded to the anchor node LMA1, by utilizing the first security association SA1. In step 6-5, data traffic addressed to the roaming user terminal UE1-2 is received from the anchor node LMA1, by utilizing the first security association SA1. In step 6-6, the received data traffic is forwarded to the access node MAG2, by utilizing the second security association SA2. It should be noted that the data transmission between the external network E and the user terminal UE1-3 is carried out accordingly, but in that case the access node to be used is MAG3, and the second security association to be used is SA3 (established between Ha and MAG3). It should also be noted that in the second embodiment of the present solution, the data transmission between the external network E and the roaming user terminal UE1-4, UE1-5 is carried out accordingly, but in that case the first concentrator node Ha receives the data traffic addressed to the external network E, from the second concentrator node Hb (instead of the access node), and the first concentrator node Ha forwards the data traffic addressed to the roaming user terminal UE1-4, UE1-5 to the second concentrator node Hb (instead of the access node).

Figure 7:
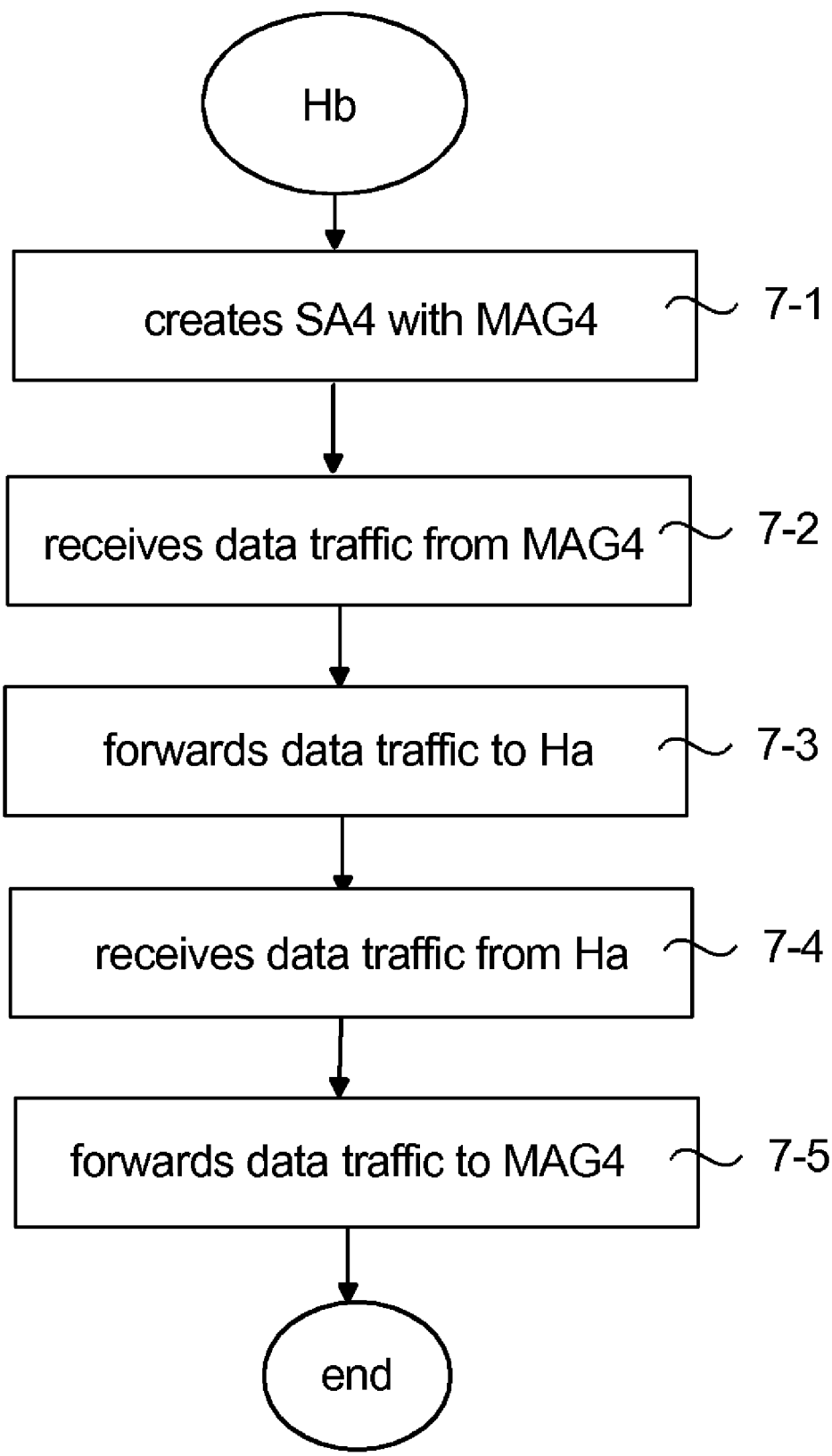
FIG. 7 is a flow chart illustrating the functionality of a concentrator node according to an embodiment of the present solution.

FIG. 7 illustrates the functionality of the second concentrator node Hb (such as a second proxy mobile IPv6 hub) according to a second embodiment of the present solution. With reference to FIG. 7, the second security association SA4 is established, in step 7-1, with the access node MAG4 (such as a mobility access gateway) located in the roaming operator network N4. In step 7-2, data traffic addressed to the external network E is received from the access node MAG4 by utilizing the second security association SA4. In step 7-3, the received data traffic is forwarded to the first concentrator node Ha (such as a proxy mobile IPv6 hub). In step 7-4, data traffic addressed to the roaming user terminal UE1-4 is received from the first concentrator node Ha. In step 7-5, the received data traffic is forwarded to the access node MAG4 by utilizing the second security association SA4. It should be noted that the data transmission between the external network E and the user terminal UE1-5 is carried out accordingly, but in that case the access node to be used is MAG5, and the second security association to be used is SA5 (established between Hb and MAG5).

It should be noted that the transmission of the data traffic may be initialized by the external network E (instead of the roaming user terminal UE1-2, UE1-3, UE1-4, UE1-5), in which case, for example, the transmission of the messages 2-7, 2-8, 2-9, 2-10 is carried out before the transmission of the messages 2-3, 2-4, 2-5, 2-6.

It should be noted that the connection between Ha and Hb, via which the data is forwarded in the second embodiment, may be implemented in any suitable data transmission technique. It should also be noted that in addition to GRXa and GRXb, if needed, one or more further interconnecting networks may be involved in forwarding the data traffic between Ha and Hb. The interconnecting networks in question are then responsible for the implementation of the data connection between different interconnecting networks.

An example of data traffic from the user terminal to the external network is that the user terminal transmits a service request requesting for an Internet service or application. An example of data traffic from the external network to the user terminal is that an Internet service or application requested by the user terminal is transmitted to the user terminal. The present solution can be applied to the uplink and/or to the downlink data traffic. The data traffic may include, for example, music files, voice files, data files, speech etc.

An advantage of the invention is that the home network operator only needs to agree on a single security association SA1 in the home network and on a single security association SA2 in each roaming network, in order to arrange secured data connections for its roaming subscribers by using the proxy mobile IPv6 protocol.

Although the home network has several roaming partners, LMA1 only needs to be connected to a logically single Ha (accordingly, from the MAG point of view, MAG logically communicates with a single hub, although traffic is transmitted to several LMAs). SA1 exists between LMA1 and Ha (not between LMA1 and each of the access nodes MAG2, MAG3, MAG4, MAG5 as in conventional solutions). Ha and/or Hb take care of the roaming connections and the security associations SA2, SA3, SA4, SA5 with the respective access nodes MAG2, MAG3, MAG4, MAG5.

By means of the present solution, despite of a huge number of user terminals related to the service and the proxy mobile IPv6 protocol, all terminals (the home network of which is N1) can be represented by the same SA1 between Ha and LMA1. In the present solution, a security association is cut into two pieces SA1 and SA2 between the Ha and LMA1, and Ha and MAG2. The proxy mobile IPv6 protocol allows this since the security association between the mobile access gateway and the local anchor node is an IPSec security association, and the connection between them is an IPSec VPN.

In practise, the hub Ha, Hb does not need to "understand" the proxy mobile IPv6 protocol. The hub decapsulates and encapsulates data traffic between different IPSec tunnels. Mobile IP-tunnelled traffic is transmitted within IPSec, wherein in case of IPv6 the mobile IP-tunnelled traffic may be transmitted normally, and in case of IPv4 it may be necessary to use an additional GRE (generic routing encapsulation) tunnel within IPSec, if IPv4 addresses come from private space. User plane data is transmitted within the mobile IP tunnel. The end-points of the mobile IP tunnel are MAG and LMA, and based on that knowledge, the IPSec-terminated hubs are able to route proxy mobile IPv6-tunnelled traffic in IP sense.

Advantages of the present solution include high scalability from the home network operator's point of view, and the fact that changes in the proxy IPv6 protocol are not necessary. The solution allows easy management and configuration of roaming connections when using proxy mobile IPv6-based technology for roaming. From the interconnecting network operator's point of view, the present solution enables a new operation and service model in the form of the proxy mobile IPv6 hub, as described above. Thus the interconnecting network may increase its profitability by adding new intelligence and new chargeable services into its network. The present solution changes the conventional roaming model. In the present solution, bilateral agreements between the operators of the end-users are not necessary any more, but those belonging to the same roaming/interconnecting community are reachable to each other without special actions. The present solution allows easy deployment of multilateral roaming arrangements from the operator point of view.

The security associations may be established as dynamic or static security associations. An established security association may be a time-dependent certificate having a predetermined lifetime (e.g. a week, month, year), thus requiring a new ratification after the expiry of the validity of the certificate. A static security association is checked when it is established. A dynamic security association is created with a roaming client having a new mobile access gateway. If there are no roaming users between MAG and the hub (or LMA), no IPSec tunnel is needed between them either. The first terminal that is authenticated via MAG to the network and needs the connection in question, begins a dynamic creating of SA between MAG and the appropriate hub (or LMA).

It should be noted that the interconnecting network, home network, and/or roaming network may in practise be owned by the same company, but they are logically considered different operators from the present solution's point of view.

The items and steps shown in the figures are simplified and only aim at describing the idea of the invention. Other items may be used and/or other functions carried out between the steps. The items serve only as examples and they may contain only some of the information mentioned above. The items may also include other information, and the titles may deviate from those given above. The order of the items and/or steps may deviate from the given one. Instead of or in addition to an anchor node, concentrator node, access node, and/or user terminal, the above-described operations may be performed in any other element of a communications system.

In addition to prior art means, a system or system network nodes that implement the functionality of the invention comprise means for establishing a security association and for transmitting data by utilizing the established security association in a manner described above. Existing network nodes and user terminals comprise processors and memory that can be utilized in the operations of the invention. Any changes needed in implementing the invention may be carried out using supplements or updates of software routines and/or routines included in application-specific integrated circuits (ASIC) and/or programmable circuits, such as EPLDs (electrically programmable logic device) or FPGAs (field programmable gate array).

It will be obvious to a person skilled in the art that, as the technology advances, the inventive concept can be implemented in various ways. The invention and its embodiments are not limited to the examples described above but may vary within the scope of the claims.

The invention claimed is:

1. A method for providing a security service to data traffic in a communications system, the system comprising
a home operator network,
a roaming operator network, and
an interconnecting operator network,
the method comprising establishing at least one operator-specific security association for securing data traffic in the system,
wherein the method comprises
establishing a first security association between an anchor node located in the home operator network and a concentrator node located in the interconnecting operator network;
establishing a second security association between an access node located in the roaming operator network and the concentrator node located in the interconnecting operator network; and
transmitting data traffic between the anchor node located in the home operator network and one or more user terminals roaming in the roaming operator network such that the data traffic transmitted between the anchor node and the concentrator node is secured by using the first security association and the data traffic transmitted between the access node and the concentrator node is secured by using the respective second security association, wherein the home operator network is the home network of said one or more user terminals.

2. A method according to claim 1, wherein the first security association is established so that the first security association is home-operator-network-specific.

3. A method according to claim 1, wherein the second security association is established so that the second security association is home-operator-network-specific and roaming-operator-network-specific.

4. A method according to claim 1, wherein the method comprises establishing a security association between the home operator network and each roaming partner network of the home operator network.

5. A method according to claim 1, wherein the first security asso-ciation expires after a predetermined time period.

6. A method according to claim 1, wherein the second security association expires after a predetermined time period.

7. A communications system comprising
a home operator network,
a roaming operator network, and
an interconnecting operator network,
wherein the system is configured to establish at least one operator-specific security association for securing data traffic,
wherein the system is further configured to
establish a first security association between an anchor node located in the home operator network and a concentrator node located in the inter-connecting operator network;
establish a second security association between an access node located in the roaming operator network and the concentrator node located in the interconnecting operator network; and
transmit data traffic between the anchor node located in the home operator network and one or more user terminals roaming in the roaming operator network such that the data traffic transmitted between the anchor node and the concentrator node is secured by using the first security association and the data traffic transmitted between the access node and the concentrator node is secured by using the respective second security association, wherein the home operator network is the home network of said one or more user terminals.

8. A system according to claim 7, wherein the first security association is established so that the first security association is home-operator-network-specific.

9. A system according to claim 7, wherein the second security association is established so that the second security association is home-operator-network-specific and the roaming-operator-network-specific.

10. A system according to claim 7, wherein it is configured to establish a security association between the home operator network and each roaming partner network of the home operator network.

11. A system according to claim 7, wherein the first security association expires after a predetermined time period.

12. A system according to claim 7, wherein the second security association expires after a predetermined time period.

13. A system according to claim 7, wherein the concentrator node comprises a proxy node mobile.

* * * * *